Figure 1:
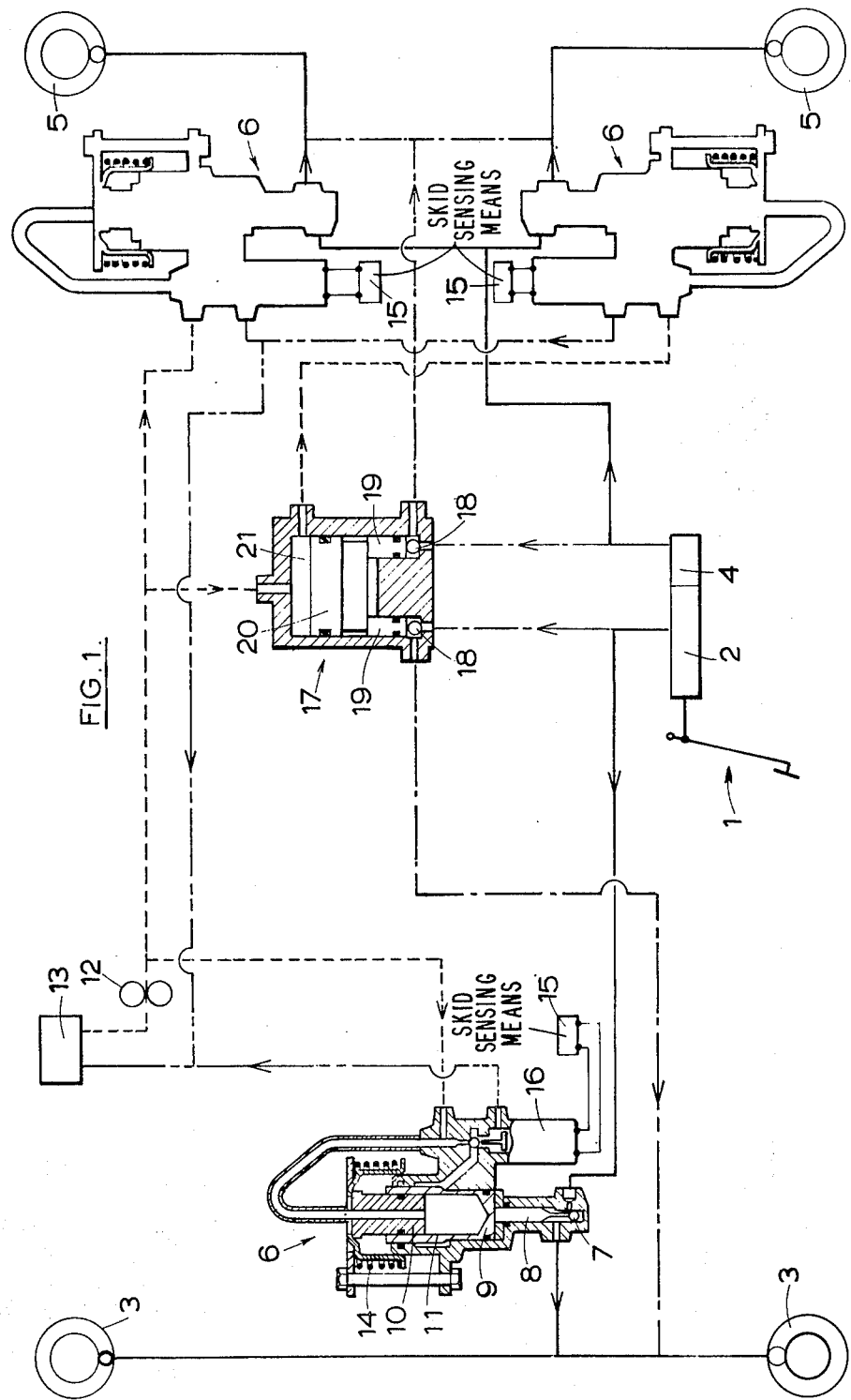

United States Patent [19]
Harries

[11] 3,941,427
[45] Mar. 2, 1976

[54] ANTI-SKID BRAKING SYSTEM FOR VEHICLES

[75] Inventor: David Anthony Harries, Shirley, England

[73] Assignee: Girling Limited, Birmingham, England

[22] Filed: Nov. 26, 1973

[21] Appl. No.: 418,873

[30] Foreign Application Priority Data
Dec. 2, 1972   United Kingdom............... 55775/72

[52] U.S. Cl................ 303/21 AF; 303/6 R; 303/10; 303/21 F
[51] Int. Cl.²........................................... B60T 8/06
[58] Field of Search.......... 303/21 F, 21 AF, 61–63, 303/68–69, 10, 6 R; 188/181 A, 181 R, 345

[56] References Cited
UNITED STATES PATENTS

| | | |
|---|---|---|
| 3,602,554 | 8/1971 | Ichimura et al............... 303/21 F X |
| 3,672,731 | 6/1972 | Koivuner............................ 303/21 F |
| 3,704,044 | 11/1972 | Ingram et al....................... 303/21 F |
| 3,724,915 | 4/1973 | MacDuff............................. 303/21 F |
| 3,788,710 | 1/1974 | Grunberg et al................... 303/21 F |
| 3,810,680 | 5/1974 | Schenk........................... 303/21 F X |
| 3,813,130 | 5/1974 | Inada........................... 303/21 AF X |

Primary Examiner—Trygve M. Blix
Assistant Examiner—Douglas C. Butler
Attorney, Agent, or Firm—Scrivener Parker Scrivener and Clarke

[57] ABSTRACT

An anti-skid braking system for vehicles includes a connection between a master cylinder and each wheel brake by-passing a modulator for modulating the braking pressure in the event of a skid. Each by-pass connection is controlled by a valve and all the by-pass valves are normally maintained closed by a single piston responsive to the same fluid pressure which operates the modulator. The system may also include valves for isolating the modulator from the wheel brakes when the by-pass valves open.

2 Claims, 2 Drawing Figures

ANTI-SKID BRAKING SYSTEM FOR VEHICLES

SPECIFIC DESCRIPTION

This invention relates to hydraulic braking systems for vehicles of the kind comprising a pedal-operated master cylinder controlling a supply of hydraulic fluid under pressure to a wheel brake, skid sensing means for providing a control signal when the deceleration of a braked wheel exceeds a predetermined value, and a modulator including a variable volume chamber having an inlet controlled by a valve and connected to the master cylinder and an outlet connected to the wheel brake, the modulator being responsive to the control signal to close the inlet valve and increase the volume of the chamber.

In known systems a modulator has been provided with a by-pass valve which automatically opens to allow direct communication with the brake in the event of a failure in the normal condition of the modulator. The disadvantage of this arrangement is that it tends to make the modulator more complex and bulky and there is the possibility of a faulty modulator influencing the operation of the by-pass valve.

According to the present invention a braking system of the kind set forth comprises a plurality of modulators interposed between the master cylinder and a plurality of wheel brakes, a connection between the master cylinder and each wheel brake by-passing the modulator, a normally closed by-pass valve controlling each by-pass connection, all the by-pass valves being combined in a single valve assembly, and means for opening each by-pass valve in response to a malfunction of the associated modulator.

Thus, the by-pass valves are all advantageously in an assembly separate from the modulators which can be standard production units.

In a system in which the inlet valve of each modulator is normally maintained open by a piston biassed by hydraulic fluid from a high pressure source, fluid from the same source may be arranged to act on a safety piston in the valve assembly for keeping all the by-pass valves closed. Therefore, if there is a failure in the high pressure source the by-pass valves automatically open and normal braking is available.

According to another aspect of this invention, in a braking system of the kind set forth a normally open isolating valve is located on the downstram side of the modulator, and a normally closed by-pass valve controls a connection between the master cylinder and wheel brake by-passing the modulator, the isolating valve closing and the by-pass valve opening in response to a malfunction of the modulator. The by-pass valve and the isolating valve may be combined in a single double seat valve. The isolating valve ensures that the variable volume chamber of the modulator is isolated from the brake when the by-pass connection is open.

Figure 2:
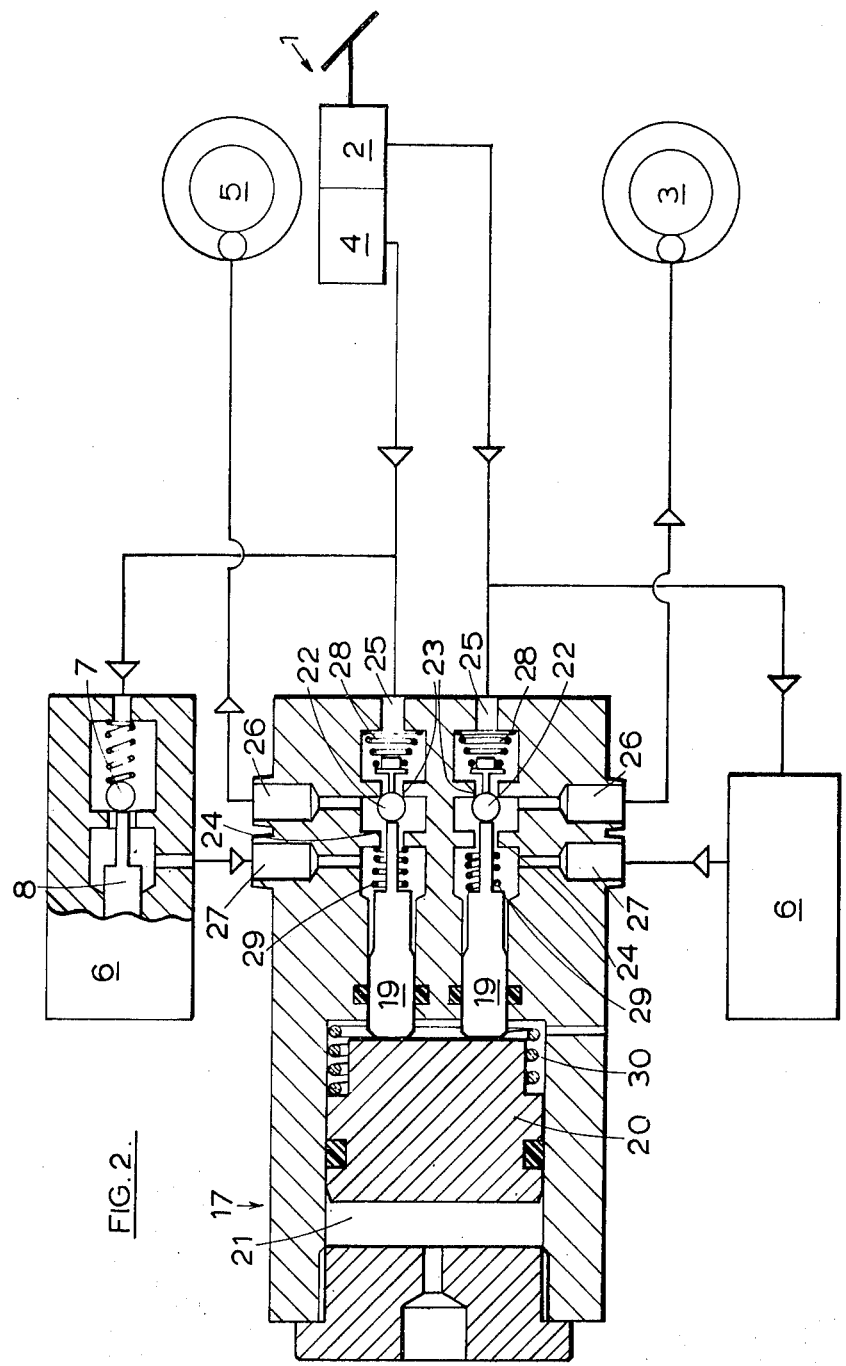

Two examples of hydraulic braking systems according to our invention are illustrated in FIGS. 1 and 2 of the accompanying drawings.

FIG. 1 shows an anti-skid hydraulic braking system in which a tandem master cylinder 1 supplies hydraulic fluid from a primary pressure space 2 to the brakes on the rear wheels 3 of a vehicle and supplies fluid from a secondary pressure space 4 to the front wheels 5. A pressure modulator 6 is located between the master cylinder 1 and each front wheel brake, and in a supply line common to both rear wheel brakes. An inlet valve 7 in each modulator is normally held open by an expander piston 8 which is held in a forward position by a modulator piston 9. A third piston 10 works in a recess 11 in the modulator piston 9 and hydraulic fluid from a pump 12 and reservoir 13 is continuously applied to this recess 11 to hold the modulator piston 9 forward and the third piston 10 rearward against the force in a light spring 14. In this inoperative condition the inlet valve is open and the brakes can be applied normally.

In the event of a skid, skid sensing means 15 send an electrical control signal to open solenoid control valve 16 which connects the recess 11 to the opposite side of modulator piston 9, equalising the differential pressure across the piston and allowing it to move rearwardly. The inlet valve 7 closes and movement of the expander piston 8 increases the volume of the chamber in which it is housed, relieving the braking pressure.

The primary and secondary pressure spaces 2 and 4 are also connected to the wheel brakes by lines by-passing the modulator 6 and controlled by a pressure responsive valve assembly 17. This assembly includes two ball valves 18 normally held closed by control pistons or plungers 19 each engaged by a common safety piston 20. A pressure space 21 behind the piston is connected to the modulator supply pump 12 and also to one of the front wheel modulators 6.

In the event of failure of the modulator power supply the pressure of the master cylinder supply will open valves 18 to apply the brakes directly. With no biassing pressure in recess 11 the only force holding piston 9 forward is spring 14 and this will be insufficient to keep inlet valve 7 open when full braking pressure is applied to expander piston 8. In this system, even with a by-pass, there will be some modulating effect due to the retracting movement of expander piston 8 and satisfactory application of the brakes would depend on there being sufficient fluid displacement available from the master cylinder. A power master cylinder, for example, would obviously be capable of supplying enough fluid. The inclusion of the by-pass means that spring 14 can be made much smaller and lighter than would be necessary if it were the only means of keeping inlet valve 7 open in the event of a power failure.

A modification of this system is shown in FIG. 2 where equivalent parts have given the same reference numerals. The rear section modulator 6, the solenoid valve 15 and the power supply 12, 13 have been omitted and only one wheel brake and modulator have been shown for each braking circuit.

In this system the valve assembly 17 comprises two ball valves 22 each arranged to co-operate with two valve seats 23 and 24. Seat 23 is located between an inlet port 25 connected to the master cylinder and an outlet port 26 connected to a wheel brake 3, 5. Seat 24 is located between outlet port 26 and a second inlet port 27 connected to the outlet of modulator 6. Normally, balls 22 are held in contact with seat 23 by plungers 19 which are biassed to the forward position by a safety piston 20 acted upon by the modulator power supply. Thus, normally the by-pass connection to the wheel brake is closed and fluid from the master cylinder 1 passes through inlet valve 7 and valve seat 24 to the brake. In the event of a skid inlet valve 7 closes but valve 22 is unaffected and movement of expander piston 8 enlarges the volume of the chamber downstream of inlet valve 7.

In the event of the modulator power supply failing inlet valve 7 closes and valve 22 moves to engage seat 24 thus opening the by-pass connection to the brake and isolating the modulator from the wheel brake i.e. valve 22 acts as a double seat valve. To assist in opening the by-pass valve, biassing springs are provided for ball 22, the plunger 19 and piston 20 namely springs 28, 29 and 30. The space between the seals on piston 20 and plungers 19 is vented to atmosphere.

It will be clear that in this system movement of the expander piston 8 will have no effect on the braking pressure if the modulator power supply fails. Thus, there is no need to fit the spring 14 to the modulator.

Only two valves 22 are shown but the number could be arranged to suit the number of modulators which require by-passing.

Only pressure responsive by-pass valves have been described but they could be solenoid valves triggered by a signal from a warning circuit monitoring the operation of the modulating means.

I claim:

1. An hydraulic braking system for a vehicle comprising a plurality of wheel brakes, a pedal-operated master cylinder controlling hydraulic fluid under pressure to said wheel brakes, skid sensing means for providing a control signal when the deceleration of a braked wheel exceeds a predetermined value, a plurality of modulators each defining a variable volume modulator chamber, a common fluid pressure source for actuating all of said modulators, a respective inlet to each of said modulators chambers connected to said master cylinder, a respective inlet valve controlling each of said inlets and maintained normally open by fluid pressure from said common source acting across a respective movable wall, a respective outlet from each of said chambers connected to a respective one of said wheel brakes, means responsive to said signal for operating said modulators each modulator when operated closing a respective one of said inlet valves and increasing the volume of its respective modulator chamber, a respective connection between said master cylinder and a respective one of said wheel brakes by-passing the modulator associated with that wheel brake, a respective normally closed by-pass valve controlling each of said by-pass connections, a respective normally open isolating valve provided on the downstream side of each modulator output, each of said isolating valves being combined with a respective one of said by-pass valves to define a single double-seat valve, and all of said by-pass and isolating valves being combined in a single valve assembly comprising a housing, a safety piston working in a bore in the housing and subjected to fluid pressure from said common fluid pressure source, a respective control piston for each of said double seat valves, said control pistons being arranged side by side in bores in the housing parallel to the safety piston bore and being acted upon by the safety piston, each of said double-seat valves comprising a first valve seat located between a respective inlet connected to said master cylinder and a respective outlet connected to a respective brake, a second valve seat located between a respective second inlet connected to the respective outlet of the respective modulator and said respective valve outlet, a respective valve member for engagement alternatively with said first and second valve seats, all of said valve members normally being held in engagement with said first seats and spaced from said second seats by said safety piston to hold closed said first by-pass valves and to hold open said isolating valves, and resilient means acting on said safety piston in opposition to the fluid pressure acting on said piston whereby in the event of a failure of said common fluid pressure source the force holding said valve members against said first seats is relieved.

2. An hydraulic braking system as in claim 1 wherein the valve assembly incorporates further resilient means acting on each of said control pistons in opposition to the fluid pressure acting on said safety piston.

* * * * *